(12) United States Patent
Courteville et al.

(10) Patent No.: US 11,808,656 B2
(45) Date of Patent: Nov. 7, 2023

(54) DEVICE AND METHOD FOR MEASURING INTERFACES OF AN OPTICAL ELEMENT

(71) Applicant: FOGALE NANOTECH, Nîmes (FR)

(72) Inventors: Alain Courteville, Congenies (FR); Charankumar Godavarthi, Nîmes (FR)

(73) Assignee: FOGALE NANOTECH, Nîmes (FR)

( * ) Notice: Subject to any disclaimer, the term of this patent is extended or adjusted under 35 U.S.C. 154(b) by 23 days.

(21) Appl. No.: 17/596,169

(22) PCT Filed: Jun. 7, 2019

(86) PCT No.: PCT/FR2019/051376
§ 371 (c)(1),
(2) Date: Dec. 3, 2021

(87) PCT Pub. No.: WO2020/245511
PCT Pub. Date: Dec. 10, 2020

(65) Prior Publication Data
US 2022/0357236 A1  Nov. 10, 2022

(51) Int. Cl.
*G01M 11/02* (2006.01)
*G01B 9/02* (2022.01)
(Continued)

(52) U.S. Cl.
CPC ....... *G01M 11/0271* (2013.01); *G01B 9/0209* (2013.01); *G01B 9/02027* (2013.01);
(Continued)

(58) Field of Classification Search
CPC ............ G01M 11/025; G01M 11/0271; G01B 9/02027; G01B 9/02047; G01B 9/02084; G01B 9/0209; G01B 11/2441
See application file for complete search history.

(56) References Cited

U.S. PATENT DOCUMENTS

| 9,658,129 B2 | 5/2017 | Colonna De Lega et al. |
| 2006/0126077 A1 | 6/2006 | Ueki et al. |
| | (Continued) | |

FOREIGN PATENT DOCUMENTS

| CN | 101226344 B | 6/2010 |
| CN | 102494623 B | 5/2014 |
| | (Continued) | |

OTHER PUBLICATIONS

International Search Report and Written Opinion received for PCT/FR2019/051376, dated Feb. 25, 2020.
(Continued)

*Primary Examiner* — Michael A Lyons
(74) *Attorney, Agent, or Firm* — Greer, Burns & Crain, Ltd (57) ABSTRACT

A measurement device, for measuring the shape of an interface to be measured of an optical element having a plurality of interfaces, the device including a measurement apparatus with at least one interferometric sensor illuminated by a low-coherence source, for directing a measurement beam towards the optical element to pass through the plurality of interfaces, and to detect an interference signal resulting from interferences between the measured measurement beam reflected by the interface and a reference beam, a positioning apparatus configured for relative positioning of a coherence area of the interferometric sensor at the level of the interface to be measured, and a digital processor for producing, based on the interference signal, an item of shape information of the interface to be measured according to a field of view.

14 Claims, 4 Drawing Sheets

(51) Int. Cl.
    *G01B 9/0209*     (2022.01)
    *G01B 11/24*     (2006.01)
    *G01B 9/02015*     (2022.01)

(52) U.S. Cl.
    CPC ..... *G01B 9/02047* (2013.01); *G01B 9/02084* (2013.01); *G01B 11/2441* (2013.01); *G01M 11/025* (2013.01)

(56) References Cited

U.S. PATENT DOCUMENTS

| | | | |
|---|---|---|---|
| 2013/0010286 A1* | 1/2013 | Zhao | G01B 11/06 356/73 |
| 2013/0038863 A1 | 2/2013 | Fresquet | |
| 2015/0192769 A1* | 7/2015 | Dresel | G01B 9/02085 356/450 |

FOREIGN PATENT DOCUMENTS

| | | | |
|---|---|---|---|
| CN | 109655012 A | * | 4/2019 |
| JP | 2006-126082 A | | 5/2006 |

OTHER PUBLICATIONS

Office Action received in Japanese Application No. 2021-572593 dated Mar. 7, 2023.

\* cited by examiner

DEVICE AND METHOD FOR MEASURING INTERFACES OF AN OPTICAL ELEMENT

BACKGROUND

The present invention relates to a device for measuring the shape of interfaces in an optical element comprising a plurality of interfaces. It also relates to a method for measuring the shape of interfaces in such an optical element.

The field of the invention is, non-limitatively, that of optical control and measurement systems, in particular for the manufacture of optical elements.

During the manufacture of optical elements, such as lenses or objectives containing several lenses, it may be necessary to control or measure the shapes of the interfaces, or surfaces, of the optical elements.

The optical elements, such as optical assemblies or imaging objectives, are generally constituted by one or a plurality of lenses and optionally other components intended to shape optical beams. These components, or these lenses, can be assembled in the form of stacking in a support such as a barrel. The optical performance of such an optical element, for example an imaging objective, depends principally on the manufacturing precision of the optical components (such as the lenses) of which it is composed, and the precision with which they are positioned in the assembly.

It is therefore necessary to control the components and their assemblies. In particular, in an assembly it may be necessary to control the shape of the interfaces of the optical components or lenses, so as to determine for example elements that are non-compliant or incorrectly positioned, mis-shaped or tilted.

A device and a method for controlling shapes of optical elements such as lenses are described in document U.S. Pat. No. 9,658,129 B2. The shapes of the surfaces are measured using an interferometry technique, in particular to determine the summit or the apex thereof. However, this device requires the lens to be turned over in order to measure the two faces. Thus, it only makes it possible to measure individual components before they are assembled.

SUMMARY

A purpose of the present invention is to overcome these drawbacks.

In particular, a purpose of the invention is to propose a measurement device and method for measuring the shape of an interface or of a surface of an optical element comprising a plurality of interfaces, this device and this method allowing measurements of interfaces in an optical assembly.

Another purpose of the present invention is to propose a measurement device and method suitable for measuring or controlling the shape and the positioning of an interface in an optical element through other interfaces of this optical element.

Yet another purpose of the present invention is to propose a measurement device and method for measuring the shapes of successive interfaces.

At least one of these purposes is achieved with a measurement device, for measuring the shape of an interface to be measured of an optical element comprising a plurality of interfaces, the device comprising:

measurement means with at least one interferometric sensor illuminated by a low-coherence source, configured to direct a measurement beam towards the optical element so as to pass through said plurality of interfaces, and to selectively detect an interference signal resulting from interferences between the measurement beam reflected by said interface to be measured and a reference beam;

positioning means configured for relative positioning of a coherence area of the interferometric sensor at the level of the interface to be measured;

digital processing means configured to produce, based on an interference signal, an item of shape information of said interface to be measured according to a field of view.

Within the scope of the present invention, an "optical element" can denote any type of optical object, intended for example to be inserted in an optical beam, to shape an optical beam, and/or to produce an image. It can denote for example:

a single optical component such as a lens or a beam splitter;

an assembly of lenses and/or other optical components, such as an imaging or camera objective, or a device for shaping an optical beam.

An optical element can in particular be constituted by, or comprise, refractive elements such as lenses.

The device according to the present invention makes it possible to carry out measurements of interfaces of an optical element, and in particular stacked interfaces, in order to deduce therefrom the topology of these interfaces. These interfaces can for example comprise surfaces of lenses. The measurements make it possible to determine, for example, shapes and positions of the interfaces, or a tilt or a decentration of a lens in the optical element. It is also possible to deduce thickness measurements and the refractive index of the material of a component lens of the optical element.

These measurements can be produced with a measurement beam of an interferometric sensor illuminated by a low-coherence light source. In order to do this, the device according to the invention has positioning means for relative positioning of a coherence area of the interferometric sensor at the level of the interface to be measured. The interface to be measured can be a "buried" interface, i.e. one of the interfaces inside the optical element. In order to reach such a buried interface, the measurement beam must therefore pass through other interfaces of the optical element.

By "coherence area" is meant the area in which interferences between the measurement beam and a reference beam can form on the sensor. The coherence area can be displaced by varying the difference in the length of the optical path between the two beams, for example by modifying the optical length of one or both of the beams. When the coherence area is located at the level of an interface, interference signals between the measurement beam reflected by this interface and the reference beam can be acquired.

The device according to the invention makes it possible to selectively detect an interference signal for each interface at the level of which the coherence area is positioned, i.e. for each surface located in the coherence area. In fact, the coherence length of the light source is adjusted so as to be shorter than a minimum optical distance between two adjacent interfaces of the optical element. Thus, for each measurement, a single interface is located in the coherence area, and thus an interference signal acquired only comprises the contribution from a single interface, or only originates from a single interface.

The interference measurements are carried out according to a field of view determined by the measurement means of the device. The measurements can thus be performed either in full field, or by field-of-view scanning.

Digital processing means of the device according to the invention are configured to produce, based on the interference signal, an item of shape information of the interface measured according to the field of view.

This shape information can comprise the optical shape and/or the geometric shape of the interface to be measured.

This shape information can also comprise optical, or geometric, distances, representative of the shape and/or the position of the interface.

The shapes or distances called "optical" are the shapes or distances as they are "seen" by the measurement beam. The distances or shapes of geometric surfaces are deduced by taking into account the refractive index of the media passed through by the measurement beam.

In addition, when the measurement beam passes through interfaces before the measured interface, the interference signal is representative of an "apparent" shape or distance insofar as it includes the contribution of the interface or interfaces passed through, in particular when these interfaces are situated between two media having different refractive indices, and thus deflect or modify the measurement beam by refraction and/or diffraction depending on their shape. It is thus necessary to take into account the shape of these interfaces that are passed through, as explained hereinafter, in order to obtain the "real" optical and/or geometric shape of the measured interface.

The device according to the invention can be used, in particular, for measuring optical elements or optical assemblies during production thereof, for example objectives formed of lenses or microlenses such as smartphone objectives or for the automotive industry.

According to an advantageous embodiment, the positioning means can also be configured for relatively positioning of an object plane conjugate of an image plane of the interferometric sensor at the level of the interface to be measured.

In fact, it is possible to vary the focusing distance of the measurement beam, and/or the position of the interface to be measured relative to the measurement beam, so as to acquire interferometric signals for each interface with the measurement beam focused on the interface in question. The interface to be measured is thus positioned in an object plane conjugate to the image plane of the interferometric sensor. This makes it possible in particular to optimize the optical power coupled back into the sensor. Also, by using an element collecting the measurement beam reflected from the interface with a large digital aperture, it is possible to measure interfaces with steeper local gradients. Because of this, better measurements of the shape of the interfaces can be obtained. Moreover, the position of the interface to be measured in the object plane conjugate to the image plane of the sensor makes it possible to more easily reconstruct the surface to be measured, by avoiding in particular optical aberrations caused by defocus.

According to an embodiment, the measurement means can comprise an interferometric sensor, called point-mode interferometric sensor, configured to detect a point interference signal at a point of the field of view.

In this case, a plurality of interferometric signals is acquired by scanning the entire field of view according to a plurality of measurement points on the interface, in order to obtain items of shape information over the entire interface.

Alternatively or in addition, the measurement means can comprise an interferometric sensor, called full-field interferometric sensor, configured to detect a full-field interference signal in the field of view.

In this case, the interface to be measured can be imaged according to the field of view in a single measurement.

According to an example, the device can comprise an interferometric sensor with a Michelson interferometer.

According to another example, the device can comprise an interferometric sensor with a Mach-Zehnder interferometer.

According to an embodiment, the measurement means can comprise a point-mode interferometric sensor and a full-field interferometric sensor.

Such a combination of interferometric sensors makes it possible to improve and accelerate the acquisition of interferometric signals. Thus, it is for example possible to rapidly locate the optical position of the interfaces along the optical axis of the optical element to be measured with the point-mode sensor, in order to effectively position an object plane conjugate to an image plane of the full-field interferometric sensor at the level of an interface to be measured. It is also possible to measure the positions of the interfaces and/or the thicknesses of the components of the optical element or distances between the interfaces using the point sensor, more rapidly and/or with greater precision than with the full-field sensor, which is moreover used for measuring the shapes of the interfaces.

The positioning means can be configured to position the coherence area successively at the level of different interfaces of the optical element.

This makes it possible to acquire and process interferometric signals for each interface sequentially and separately, in order to obtain items of shape information for all of the interfaces of the optical element.

The device according to the invention can also comprise displacement means configured to displace the optical element in a plane perpendicular to the measurement beam.

Thus, in the case of a point-mode interferometric sensor, for example, the field of view can be scanned according to a plurality of measurement points.

Likewise, in the case of a full-field interferometric sensor, the field of view can be scanned according to a plurality of partial fields of view.

According to another aspect of the invention, a measurement method is proposed for measuring the shape of an interface to be measured of an optical element comprising a plurality of interfaces, the method being implemented by a measurement device comprising measurement means with at least one interferometric sensor illuminated by a low-coherence source, configured to direct a measurement beam towards the optical element so as to pass through said plurality of interfaces, and to selectively detect an interference signal resulting from interferences between the measurement beam reflected by said interface to be measured and a reference beam, the device also comprising positioning means and digital processing means, characterized in that said method comprises the following steps:

relative positioning, by the positioning means, of a coherence area of the interferometric sensor at the level of the interface to be measured;

measuring the interface using the measurement means, so as to produce an interference signal; and processing the interference signal using the digital processing means, so as to obtain an item of shape information of said interface to be measured according to a field of view.

The method according to the invention can also comprise a step of relative positioning of an object plane conjugate to an image plane of the interferometric sensor at the level of the interface to be measured.

At least the step of positioning of the coherence area and the measurement step can be implemented sequentially, or successively, in order to measure the shape of different interfaces to be measured of the plurality of interfaces.

Similarly, the step of relative positioning of an object plane conjugate to an image plane of the interferometric sensor at the level of an interface can be implemented sequentially, or successively, in order to measure the shape of different interfaces to be measured of the plurality of interfaces.

Thus, all of the interfaces of an optical element can be measured, for example, starting with the top interface and finishing with the bottom interface, passing through all of the "buried" intermediate interfaces, without it being necessary to turn over or manipulate the optical element.

The processing of the interferometric signals acquired for the successive interfaces can be performed sequentially, between measurements over the different interfaces, or once all the interference signals have been acquired for all of the interfaces.

According to an embodiment that is in no way limitative, the step of processing the interference signal comprises an analysis of a plurality of interferograms acquired for one and the same interface to be measured using profilometry.

Profilometry is based on processing sequences of interferograms acquired for a plurality of optical path differences in the interferometric sensor, and which constitute the interference signal. These sequences can be acquired in different ways according to the analysis technique implemented.

The plurality of interferograms can in particular be acquired according to a phase-shifting interferometric method.

In this case, for each interface of the optical element, a plurality of interferograms is acquired for a plurality of optical path or phase difference values between the measurement and reference beams, in a range of optical path differences smaller than the coherence length of the light source. Then the phase and optionally the amplitude of the interferogram at any point of the field of view are determined by applying a known algorithm, such as the Carré algorithm, to a succession of interference values obtained respectively at the points of this field of view for the different optical path difference values.

The plurality of interferograms can also be acquired according to a vertical scanning interferometric method.

In this case, for each interface, a plurality of interferograms is acquired for a plurality of optical path or phase difference values between the measurement and reference beams, in a range of optical path differences extending, preferably, beyond the coherence length of the light source. Then, at each point of the field of view, the optical path difference value for which the path difference between the measurement beam reflected on the interface and the reference beam is zero is determined. In order to do this, it is possible to detect for example the maximum amplitude of the envelope of the interferogram, or the position where the phase of the interferogram cancels itself out, at the point in question.

According to another non-limitative embodiment, the step of processing the interference signal can implement a calculation method using digital holography.

An interference signal or interferogram is recorded. Then a digital holography method is used to digitally reconstruct the interface in question, by simulating the process of illuminating the interferogram on the detector with a digital reference wave. Such a method has the advantage of only requiring a single image or interference signal acquisition to calculate the shape of an optical surface.

Advantageously, the step of processing the interference signal can also comprise a correction step taking account of an item of shape information of the interfaces passed through by the measurement beam, in order to obtain an item of optical shape and/or geometric shape information of the interface to be measured.

In fact, as explained above, during measurement of the surfaces or interfaces "buried" in the optical element, the optical shapes measured can also depend on the media and the shapes of the interfaces passed through by the measurement beam before reaching these buried surfaces, in particular because of modifications of wavefronts and aberrations introduced. In this case, a correction must be applied in order to determine the real optical or geometric shapes of the interfaces.

In order to carry out this correction, it is possible to use a light propagation model and prior knowledge, or knowledge acquired during previous measurements on the optical element, such as the refractive indices of materials and positions and shapes of interfaces passed through.

The method according to the invention can be implemented to measure the shapes and/or the positions of the interfaces of an optical element in the form of an optical assembly with lenses, such as a smartphone objective, the interfaces comprising the surfaces of the lenses.

BRIEF DESCRIPTION OF THE DRAWINGS

Other advantages and characteristics will become apparent on examination of the detailed description of examples that are in no way limitative, and from the attached drawings, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures keep the same reference.

Figure 1A:
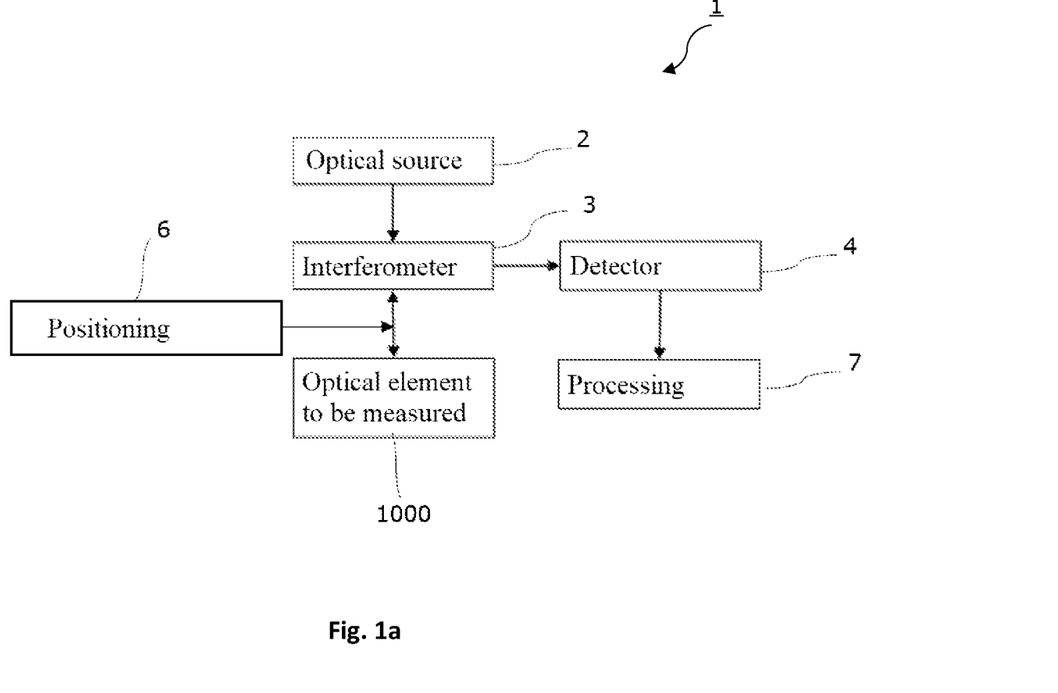
FIG. 1a is a diagrammatic representation of the principle of a measurement device according to the present invention.

FIG. 1a is a diagrammatic representation for visualizing the principle of the present invention.

A measurement device 1 is arranged to carry out measurements of the shape of an interface to be measured of an optical element 1000 having several interfaces.

The device 1 comprises a light source 2, an interferometer 3 and a detector 4. The interferometer 3 and the detector 4 can form an interferometric sensor. The source 2 is a low-coherence source, configured to direct a measurement beam towards the optical element so as to pass through the interfaces. The interferometer 3 is configured to produce an interference signal originating from the interference between the measurement beam reflected by the interface to be measured and a reference beam. The interference signal is detected by the detector 4. This interference signal contains a measurement of the optical shape of the interface from which the measurement beam is reflected. One or more interference signals are thus acquired according to a field of view on the interface.

The device 1 also comprises positioning means 6 for relative positioning of a coherence area of the interferometer at the level of the interface to be measured of the object 1000.

The device 1 also comprises digital processing means 7. These processing means 7 are configured to produce, based on the measured interference signal, an item of shape information of the interface to be measured according to a field of view. These processing means 7 comprise at least a computer, a central processing or calculation unit, a microprocessor, and/or suitable software means.

Figure 1B:
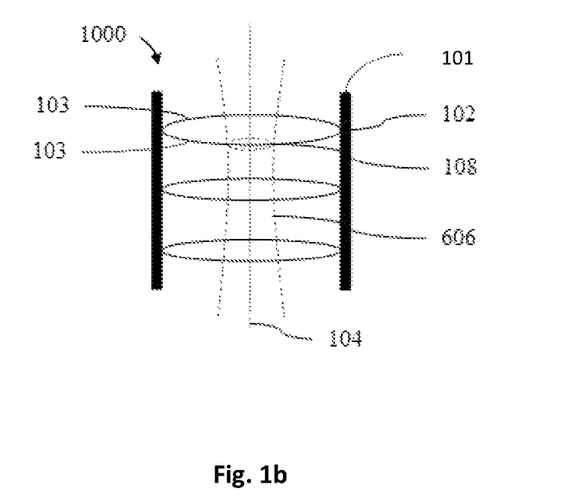
FIG. 1b is a diagrammatic representation of an example of an optical element to be measured, in particular by implementing the device of the invention.
Figure 2:
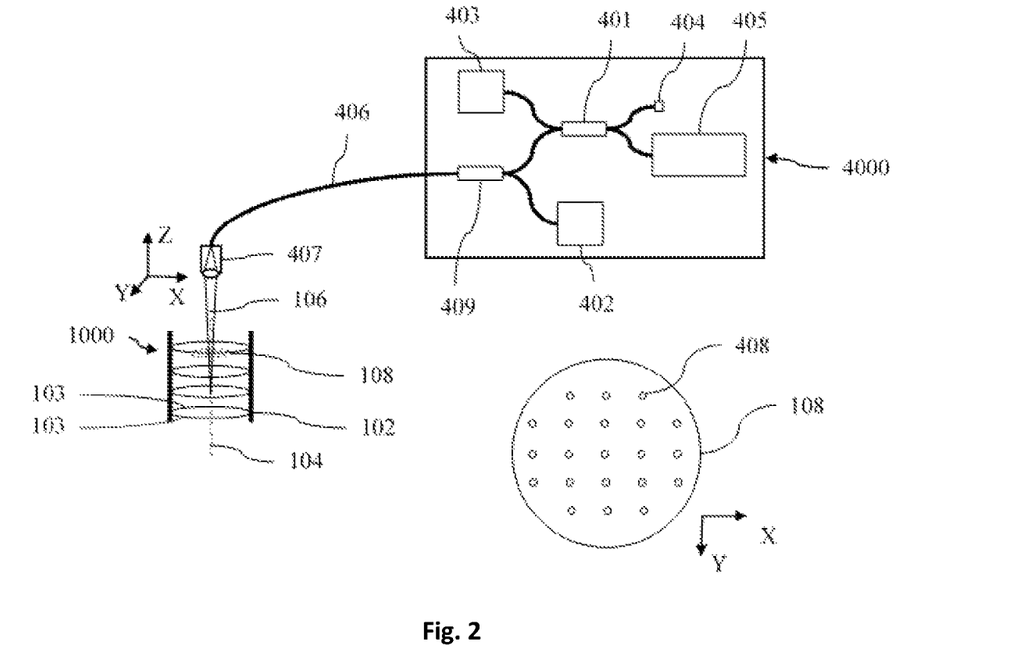
FIG. 2 is a diagrammatic representation of a first example of an interferometric device that can be used within the scope of the present invention.

FIG. 1b is a diagrammatic representation of an optical element to be measured within the scope of the present invention. The optical element 1000 of the camera objective type is constituted by a barrel 101 in which lenses 102 are positioned. The lenses 102, aligned according to an optical axis 104, have surfaces or interfaces 103. The device 1 according to the present invention is arranged to obtain an item of shape information of these surfaces or interfaces 103, according to a field of view 108 about the optical axis 104. FIG. 2 also illustrates a measurement beam 606 originating from the measurement device 1.

To obtain an optical measurement of an interface, the device according to the invention can implement different interferometry techniques. The device can in particular comprise a low-coherence interferometer operating in point mode, or a full-field low-coherence interferometer.

FIG. 2 is a diagrammatic representation of an example of an interferometric device that can be used within the scope of the present invention.

The interferometer 4000, shown in FIG. 2, is a time-domain low-coherence interferometer.

The interferometer 4000 can operate for example in the infrared. For measuring optical assemblies with antireflective coatings, it can be advantageous to choose for the interferometer a working wavelength different from those for which the antireflective coatings are optimized, in which case they may exhibit a high reflectivity. Thus, an interferometer operating in the infrared is very suitable for measuring optical assemblies intended to be used in visible wavelengths.

The interferometer 4000 operates in point mode, i.e. it only makes it possible to acquire a single point 408 at a time of a field of view 108 of the surfaces or interfaces of the optical element 1000 to be measured.

In the embodiment illustrated in FIG. 2, the interferometer 4000 comprises a double Michelson interferometer based on single-mode optical fibers. The double interferometer is illuminated by a fiber light source 402. The light source 402 can be a superluminescent diode (SLD) the central wavelength of which is, for example, of the order of 1300 nm to 1350 nm and the spectral width of which is of the order of 60 nm. The choice of this wavelength corresponds in particular to criteria of availability of the components.

The light originating from the source 402 is directed through a fiber coupler 409 and a fiber 406 to a collimator 407, to constitute the point measurement beam 106. A portion of the beam is reflected in the fiber 406 at the level of the collimator 407, for example at the silica-air or glass-air interface constituting the end of the fiber, in order to constitute a reference wave.

The retroreflections originating, for example, from the interfaces 103 of the optical element 1000 are coupled into the fiber 406 and directed with the reference wave towards a decoding interferometer constructed around a fiber coupler 401. This decoding interferometer has an optical correlator function, the two arms of which are, respectively, a fixed reference 404 and a time-delay line 405. The signals reflected at the level of the reference 404 and the delay line 405 are combined, through the coupler 401, on a detector 403, which is a photodiode. The function of the delay line 405 is to introduce an optical delay between the incident and reflected waves, variable over time in a known manner, obtained for example by the displacement of a mirror.

The length of the arms of the decoding interferometer is adjusted so as to make it possible to reproduce with the delay line 405 the differences in optical path differences between the reference wave reflected at the level of the collimator 407 and the retro-reflections originating from the interfaces of the optical element 1000, in which case an interferogram, the shape and width of which depend on the spectral characteristics of the source 402, and in particular its optical coherence length, is obtained at the level of the detector 403.

Thus, the measurement area of the interferometer 4000, with respect to the collimator 407 or to the interface of the collimator which generates the reference wave, is determined by the optical length difference between the arms of the decoding interferometer, and by the maximum course of the delay line 405. This measurement area corresponds to a coherence area in which the interface to be measured 103 must be found.

To obtain the optical shapes of the interfaces 103, the field of view 108 can be scanned according to a plurality of measurement points 408 at different positions (X, Y). To this end, the measurement device can comprise, for example, a translation table for displacing the element to be measured 1000 with respect to the collimator 407.

The field of view 108 that can be attained for the different interfaces 103 depends in particular on the numerical aperture of the collimator 407 and curvatures of the surfaces. In fact, in order to obtain a measurement, it is necessary for the specular reflection of the measurement beam 106 on the interface 103 to be coupled back into the collimator 407 and the interferometer 4000.

Figure 3:
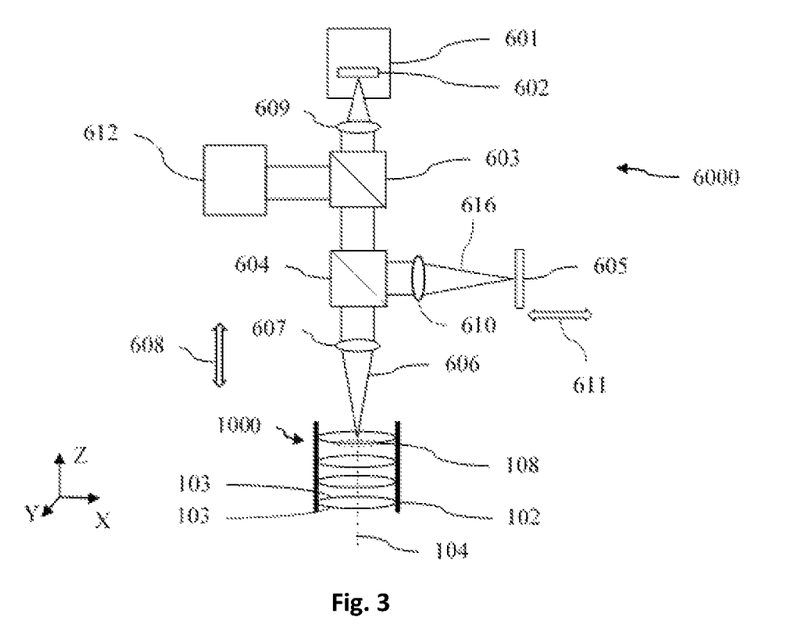
FIG. 3 is a diagrammatic representation of a second example of an interferometric device that can be used within the scope of the present invention.

FIG. 3 is a diagrammatic representation of another example of an interferometric device that can be used within the scope of the present invention.

The interferometer 6000, shown in FIG. 3, is a full-field low-coherence interferometer.

The device 6000 is based on a Michelson or Linnik interferometer formed by a separator element 604, in the shape of a cube or a beam splitter, with a measurement arm which directs a measurement beam 606 towards the optical element to be measured 1000, and a reference arm with a mirror 605 to shape a reference beam 616.

The interferometer 6000 is illuminated by a low-coherence source 612 via a light separator element 603 in the form of a cube or a beam splitter. The source 612 can comprise, for example, a superluminescent diode (SLD), a diode, a thermal light source (halogen lamp etc.) or a supercontinuum source. The source 612 can also comprise a filtering device, for example with a grating and a slit, or interference filters, for adjusting the coherence length to a few tens or a few hundreds of microns. The source 612 can be arranged to emit in visible wavelengths or the near infrared, about one or more wavelengths.

Of course, the separator elements 603, 604 can be non-polarizing, or polarizing and associated with quarter-wave splitters to make lossless couplers.

The measurement 606 and reference 616 beams, reflected into the two arms of the interferometer respectively, are directed via the light beam splitter 603 towards a camera 601 with a sensor 602 comprising a detection matrix, for example of the CMOS or CCD type.

When the optical path difference between the measurement 606 and reference 616 beams is less than the coherence length of the source 612, interferences are obtained on the detector 602.

The device 6000, as shown in FIG. 3, also comprises a focusing lens or objective 607, and a tube lens 609, arranged so as to define an object plane conjugate to an image plane formed on the sensor 602. The reference arm also comprises an objective 610 which also defines, with the tube lens 609, a reference object plane conjugate to the image plane of the sensor 602.

The device 6000 is a full-field image-forming device, which makes it possible to image interfaces 103 of the optical element 1000 according to a field of view 108 which is determined by the field of view of the imaging system and by its numerical aperture at the level of the focusing objective 607. In fact, in order to obtain a measurement, it is necessary for the specular reflection of the measurement beam 606 on the interfaces 103 to be coupled back into the imaging system.

Normally, the device 6000 comprises optical elements for focusing the illumination beam in the rear focal plane of the focusing objective 607 and of the objective 610 of the reference arm. The illumination beams are not shown in the figure for reasons of clarity.

The device 6000 also comprises a first displacement means 611 for varying the length of the reference arm, for example in the form of a translation stage 611 displacing the reference mirror 605. The objective 610 of the reference arm can also be adjustable to maintain the reference mirror 605 in an object plane conjugate to the image plane formed by the sensor 602.

The device 6000 also comprises a second displacement means 608 the function of which is to displace the object plane conjugate to the image plane formed by the sensor 602, so as for example to sequentially image the successive interfaces 103 onto the sensor 602. This displacement means 608 can comprise a system for displacing the focusing objective 607 or lenses of this objective, for example with a linear or helical translation device. Alternatively or in addition, this displacement means 608 can comprise a device or a translation stage for displacing the device 6000 with respect to the optical element 1000, or vice versa.

Figure 4:
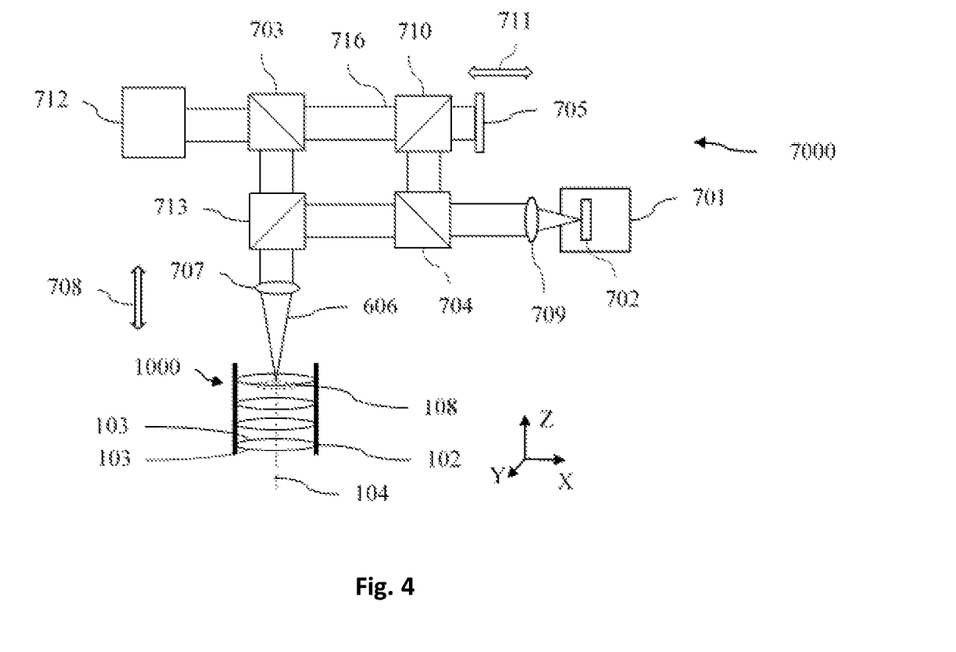
FIG. 4 is a diagrammatic representation of a third example of an interferometric device that can be used within the scope of the present invention.

FIG. 4 is a diagrammatic representation of another example of an interferometric device that can be used within the scope of the present invention.

The device 7000 is based on a Mach-Zehnder interferometer, with a measurement arm which directs a measurement beam 606 towards the optical element to be measured 1000, and a reference arm in which a reference beam 716 propagates.

The interferometer 7000 is illuminated by a low-coherence source 712. The source 712 can comprise, for example, a superluminescent diode (SLD), a diode, a thermal light source (halogen lamp etc.) or a supercontinuum source. The source 712 can also comprise a filtering device, for example with a grating and a slit, or interference filters, for adjusting the coherence length to a few tens or a few hundreds of microns. The source 712 can be arranged to emit in visible wavelengths or the near infrared, about one or more wavelengths.

The light from the source 712 is separated into a measurement beam 606 and a reference beam 716 by a first separator element 703 in the form of a cube or a beam splitter.

The interferometer 7000 comprises a second separator element 713 in the measurement arm, in the form of a cube or a beam splitter, to direct the measurement beam 606 towards the element to be measured 1000, and to transmit the reflected light into this element.

In the embodiment shown in FIG. 4, the device 7000 also comprises, in the reference arm, an adjusting element for directing and varying the length of the optical path of the reference arm. This element can be produced, for example and non-limitatively, with a separator element in the form of a cube or a beam splitter 710 and a reference mirror 705 that can be displaced translationally by translation means 711 such as a translation stage.

The measurement 606 and reference 716 beams are combined via a separator element 704, in the form of a cube or a beam splitter, and directed towards a camera 701 with a sensor 702 comprising a detection matrix, for example of the CMOS or CCD type.

Of course, the Mach-Zehnder interferometer can be produced with elements that are non-polarizing, or polarizing and combined with quarter-wave splitters, to make lossless couplers. It can also be produced, at least partially, with optical fibers.

When the optical path difference between the measurement 606 and reference 716 beams is less than the coherence length of the source 712, interferences are obtained on the detector 702.

The device 7000 also comprises a focusing lens or objective 707, and a tube lens 709, arranged so as to define an object plane conjugate to an image plane formed on the sensor 702.

The device 7000 is also a full-field image-forming device, which makes it possible to image interfaces 103 of the optical element 1000 according to a field of view 108 which is determined by the field of view of the imaging system and by its numerical aperture at the level of the focusing objective 707. In fact, in order to obtain a measurement, it is necessary for the specular reflection of the measurement beam 606 on the interfaces 103 to be coupled back into the imaging system.

Normally, the device 7000 comprises optical elements for focusing the illumination beam in the rear focal plane of the focusing objective 707. The illumination beams are not shown in the figure for reasons of clarity.

The device 7000 also comprises a displacement means 708 the function of which is to displace the object plane conjugate to the image plane formed by the sensor 702, so as for example to sequentially image the successive interfaces 103 on the sensor 702. This displacement means 708 can comprise a system for displacing the focusing objective 707 or lenses of this objective, for example with a linear or helical translation device. Alternatively or in addition, this displacement means 708 can comprise a translation device or stage for displacing the device 7000 with respect to the optical element 1000, or vice versa.

It should be noted that the interferometers 6000, 7000 as shown in FIGS. 3 and 4 can also be produced with a point detector 601, 701, making it possible to acquire only a single measurement point of the field of view 108 at a time. In this case, it is necessary to scan the field of view 108 in X, Y, as described for the device 4000 according to the embodiment in FIG. 2.

Figure 5:
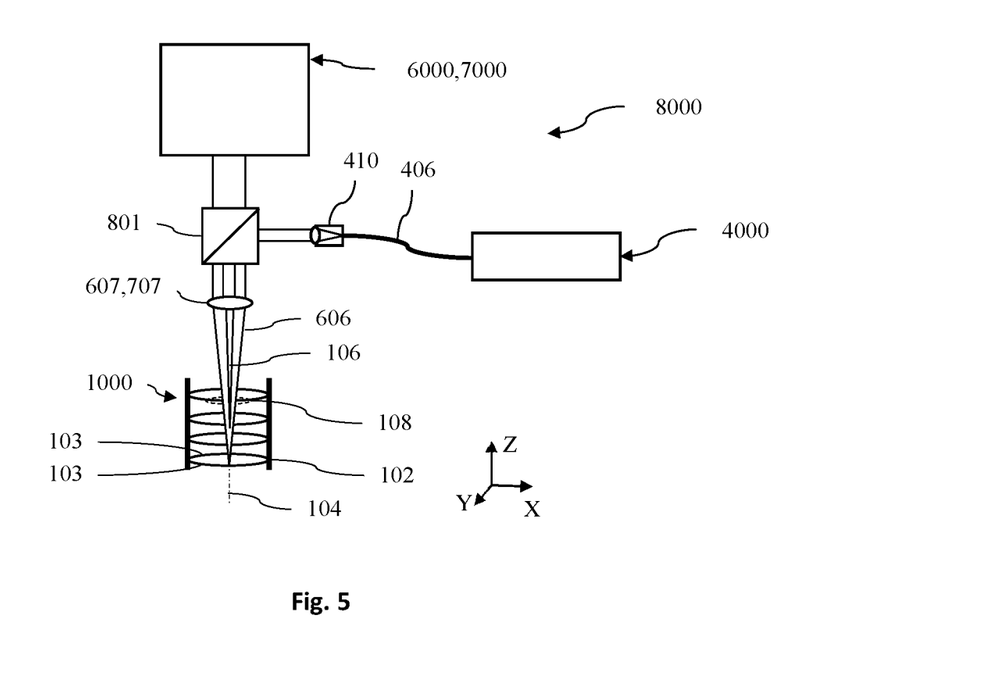
FIG. 5 is a diagrammatic representation of a fourth example of an interferometric device that can be used within the scope of the present invention.

FIG. 5 is a diagrammatic representation of another example of an interferometric device that can be used within the scope of the present invention.

The interferometric device 8000 according to the example in FIG. 5 is a combination of a full-field interferometer 6000, 7000 as shown in FIGS. 3 and 4, and a point-mode interferometer 4000 as shown in FIG. 2.

The device 8000 also comprises an optical coupling element 801 for coupling the point measurement beam 106 of the point-mode interferometer 4000, shaped by a first collimator 410, with the measurement beam 606 of the full-field interferometer 6000, 7000. The coupling element 801 is arranged so as to allow precise, and preferably fixed, relative positioning of the beams in parallel or merged propagation directions. The coupling element 108 can comprise a splitter or a semi-reflective cube, polarizing or not. It can also comprise a dichroic mirror, for example for coupling a point measurement beam 106 in the infrared with a full-field measurement beam 606 in visible wavelengths.

The point measurement beam 106 is preferably positioned on the optical axis 104 of the optical element to be measured 1000. To this end, the element to be measured 1000 and the measurement beams 106, 606 can be displaced relative to one another, for example with a translation table in the X, Y plane. The full-field interferometry camera 6000, 7000 can be used to control or visualize this displacement, and locate the optical axis for example by looking for symmetries in the image or in measurements of interface shapes.

The positioning of the beams 106, 606 on the optical axis can also be adjusted based on measurements carried out with the point-mode interferometer 4000. In fact, a positioning on the optical axis is the only position for which an incident point-mode beam is perpendicular to all of the interfaces, and thus produces measurements in particular for an optical element 1000 with refractive lenses.

This also makes it possible, on the other hand, to locate the optical axis in this way.

With the interferometric devices 4000, 6000 or 7000, when a surface or an interface 103 appears in the coherence area, an interference structure is obtained on the detector as a result of the interferences between measurement and reference beams for the field of view 108.

To deduce therefrom the shapes of surfaces, or at least visible optical surfaces, several known methods can be used, as described hereinafter.

The device 1 according to the embodiment shown in FIG. 1, comprising an interferometer according to one of the embodiments shown in FIGS. 2, 3 and 4, can be used to implement the steps of the method according to the invention which will be described hereinafter.

Figure 6:
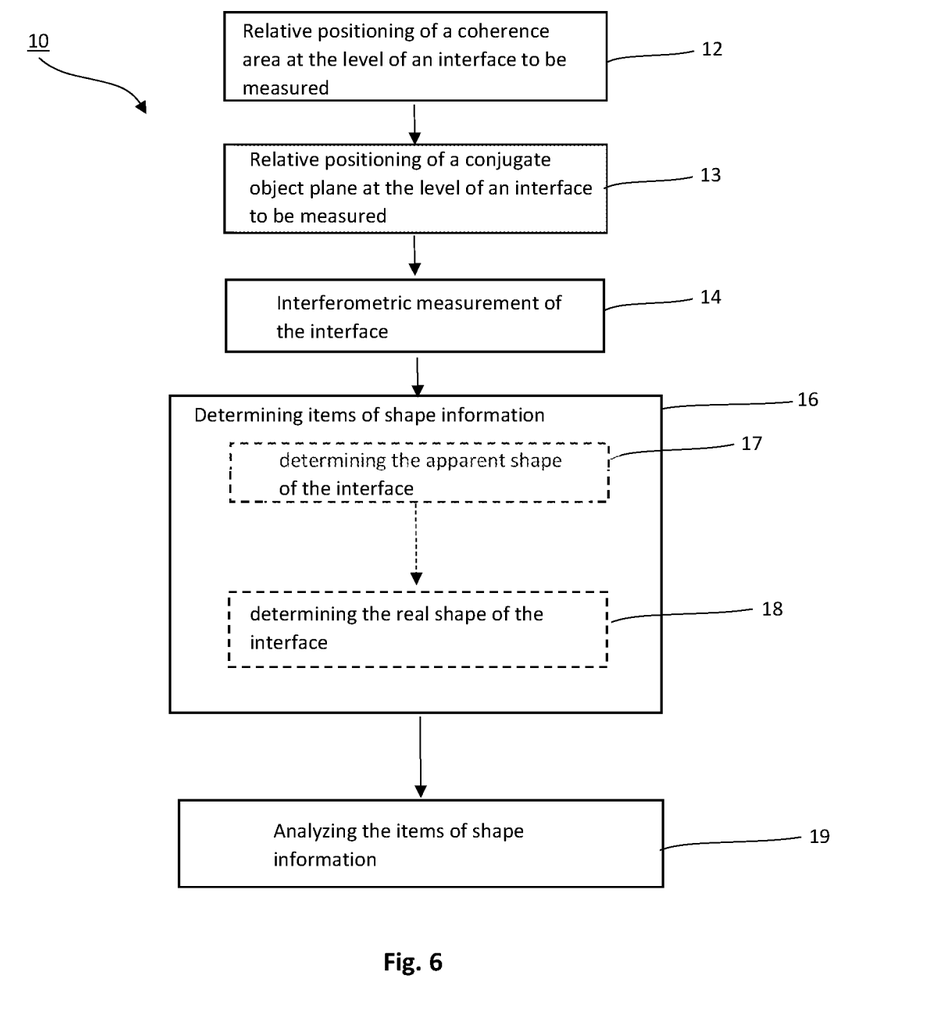
FIG. 6 is a diagrammatic representation of a non-limitative embodiment example of a measurement method according to the present invention.

FIG. 6 is a diagrammatic representation of a non-limitative embodiment example of a measurement method according to the invention.

The method 10, shown in FIG. 6, comprises a step 12 of relative positioning of a coherence area at the level of an interface to be measured 103 of an optical element 1000.

If the depth of field of the focusing objective 407, 607, 707 is sufficient to obtain a signal from all of the interfaces 103 of the element to be measured, by modifying the optical length of the reference arm, for example by displacing the reference mirror 605, 705 or by varying the length of the delay line 405, the coherence area in which interferences between the measurement 106, 606 and reference 616, 716 beams can form on the detector 602, 702, 403 is displaced along the optical axis 104. When this coherence area passes through an interface 103, it is possible to acquire interference signals at all points of the measurable field of view 108.

According to the embodiment shown in FIG. 6, the method 10 also comprises a step 13 of relative positioning of an object plane conjugate to the image plane on the sensor 602, 702 at the level of the interface to be measured 103.

In fact, it is preferable to position the interface 103 to be measured in an object plane conjugate to the image plane situated on the sensor 602, 702 or in the collimator 407 at the end of the optical fiber 406, by varying the focusing distance of the measurement beam. This makes it possible to optimize the power coupled back into the imaging system and to measure the interface according to a field of view 108 with steeper local gradients, because of a better utilization of the numerical aperture of the collimator 407 or of the focusing objective 607, 707.

In the examples of interferometers shown in FIGS. 2, 3 and 4, the displacement of the coherence area and the displacement of the object plane are carried out in the following manner.

The displacement of the coherence area along the optical axis 104 is carried out, for example, by displacing the reference mirror 605, 705. A displacement, in terms of optical distance, of the reference mirror leads to an identical displacement, also in terms of the optical distances, of the coherence area along the optical axis 104. It should be remembered that the optical distances correspond to the geometric distances multiplied by the refractive index of the media passed through.

The displacement of the object plane, to position it on the successive interfaces, is carried out, for example, by varying the distance Z between the collimator 407 or the focusing objective 607, 707 and the optical element to be measured 1000, and/or by varying the focusing distance of the collimator 407, of the focusing objective 607, 707 or other optical elements inserted into the measurement beam. The detection of the optimal focusing distance can be carried out based, for example, on a criterion of maximum coupled-back power, or maximum image contrast or interference fringes.

It sometimes happens that it is not possible to focus the measurement beam 606 on a particular interface of the element to be measured 1000. This depends in particular on the refractive power or the optical power of the collimator 407 or of the focusing objective 607, 707 and curvatures of the interfaces of the optical element 1000 passed through. In this case, it is possible to rely an optimum coupled-back power. However, in general, it is preferable to use a collimator 407 or a focusing objective 607, 707 with a refractive power or a high optical power in front of the refractive power of the optical components of the optical element 1000 to be measured (or at least higher) and a large numerical aperture to be able to measure the interfaces 103 under good conditions.

The displacement to be carried out to position the object plane on the successive interfaces depends on the succession of media passed through by the measurement beam 606 and curvatures of the surfaces or interfaces encountered. Therefore, it does not necessarily vary linearly with a relative displacement of the element 1000 or of the theoretical position of the object plane in vacuo or in air (in the absence of the element 1000).

These two displacements, of the coherence area and of the object plane, must thus be carried out in a coordinated manner, where necessary, so as to superimpose the coherence area on the object plane in question.

In the case of the implementation of a point-mode interferometer combined with a full-field interferometer as illustrated for example in FIG. 5, it is possible to use a point measurement beam 106 with a weak numerical aperture, and thus with a large depth of field, to rapidly and very precisely obtain the (optical) position of all of the interfaces 103 along the optical axis of the element to be measured 1000. It should be noted that for this point measurement along the optical axis it is not necessary for the interfaces to be measured to be in an object plane conjugate to the image plane of the point-mode interferometer 4000.

It is thus possible to sequentially measure the interfaces 103 with the full-field interferometer 6000, 7000, using position measurements obtained with the point-mode interferometer 4000, so as to more quickly and more effectively adjust set this full-field interferometer for each interface, in particular to position the coherence area and the object plane conjugate to the image plane of the detector.

Setting such a combined device can be performed as follows:
  determining the optical position of an interface 103 along the optical axis using the point-mode interferometer 4000;
  setting the coherence area of the full-field interferometer 6000, 7000 about this optical position; and
  adjusting the position of the object plane of the full-field interferometer 6000, 7000, for example with the focusing objective.

During a step 14 of the method 10, the interface of the element to be measured, which has been positioned in the coherence area and, optionally, in the object plane during the preceding steps 12, 13 as detailed above, is measured by means of the measurement beam 106, 606.

Figure 7:
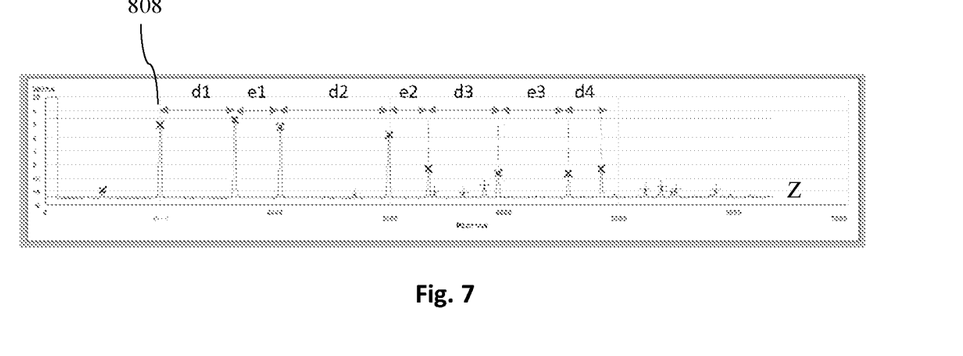
FIG. 7 is an example of the measurement of an object to be measured obtained with the present invention.

FIG. 7 shows an example of an interferometric measurement result obtained in point mode with a low-coherence interferometer such as illustrated in FIG. 2, for an optical element 1000 of the camera objective type, formed by a stack of four microlenses 102 along one and the same optical axis 104, as illustrated in FIG. 1b. These microlenses have respective thicknesses d1, d2, d3 and d4 and are separated by gaps e1, e2 and e3.

More particularly, FIG. 7 shows peaks 808 which correspond to interferogram envelopes obtained for all of the interfaces of the optical element 1000. The peaks are representative of reflections of the measurement beam on the interfaces. The respective positions of the surfaces of the microlenses are indicated by crosses, the other peaks being caused by parasitic reflections. This measurement corresponds to a measurement point 408 of the field of view 108, for all of the interfaces in the direction Z of the optical axis 104 of the optical element 1000 to be measured. This measurement is carried out on the optical axis 104.

The values obtained are optical distances, in the direction Z of the optical axis 104, and counted with respect to a position reference of the interferometer located for example by constructing, at the level of the collimator 407 of the interferometer 4000 in FIG. 2, interfaces 103 of the different components or lenses 102, for a position (X, Y) in the field of view 108. The measurements must be repeated for all of the points (X, Y) of the field of view for obtaining an interference structure for the entire field of view, and for all of the interfaces 103 of the optical element.

When the measurements are carried out with a full-field interferometer, as illustrated in FIGS. 3 and 4, a structure of interferences resulting from the interferences between measurement and reference beams is directly obtained on the detector for the entire field of view 108.

To obtain real geometric shapes of the surfaces or interfaces of the optical element, the optical shapes thereof must be determined in advance, and corrected for the propagation effects as described hereinafter.

During a processing phase 16 of the method 10, all of the interference signals for an interface to be measured are processed digitally in order to deduce therefrom an item of shape information of this interface.

During a first step 17 of the processing, the optical shape of the interface is determined. This optical shape is called "apparent" as it is affected by any interfaces passed through, as described hereinafter. It is deduced from the interferometric measurements.

Different known methods can be used to determine optical and/or geometric shapes.

According to a first embodiment, profilometric methods can be used to perform step 17. Profilometry is based on the processing of sequences of interferograms.

In this type of methods, the measurement and reference beams are adjusted, preferably, so as to be incident on the detector with propagation directions essentially parallel or merged, or slightly tilted, so as to produce solid or slightly modulated interferograms.

A first example of such a profilometric method implements algorithms based on phase-shifting, or phase-stepping, interferometry (PSI).

To this end, for each interface i of the optical element, a plurality of interferograms (constituting the interference signal) is acquired for a plurality of optical path or phase difference values between the measurement and reference beams, within the limit of the coherence length of the light source.

Then, the phase and optionally the amplitude at any point of the field of view 108 of the thus-constituted interference signal are determined by applying a known algorithm, such as the Carré algorithm, to the succession of interferograms obtained at the point in question for the different phase shifts, and by unwrapping the thus-obtained modulo-2pi phase.

Thus a set of measured phase difference values $\varphi_{mi}(r_d)$ are obtained in the plane of the detector (or, more precisely, phase differences between the measurement and reference beams on the detector), $r_d$ being a vector of co-ordinates towards points of the plane of the detector in a reference system (X, Y, Z).

It is thus possible to determine the optical shape $L_{mi}(r_d)$ of the surface i with the conventional relationship:

$$L_{mi}(r_d) = \varphi_{mi}\lambda/4\pi, \tag{1}$$

with $\lambda$ the central wavelength of the source in vacuo.

The geometric shape $S_{mi}(r_d)$ can be deduced from the optical shape by the relationship:

$$S_{mi}(r_d) = L_{mi}(r_d)/n, \tag{2}$$

where n is the group refractive index of the medium in which the measurement beam is reflected.

A second example of a profilometric method implements algorithms based on vertical scanning interferometry (VSI).

To this end, for each interface i, a plurality of interferograms (constituting the interference signal) is acquired for a plurality of optical retardations between the measurement and reference arms of the interferometer, in a range of optical retardations extending, preferably, beyond the coherence length of the light source.

At each point $r_d$ of the detector, the optical retardation for which the optical path difference between the measurement beam reflected on the interface i and the reference beam is zero is detected. In order to do this, it is possible to detect for example the maximum amplitude of the envelope of the interferogram, or the position where the phase of the interferogram cancels itself out. Thus the optical shape $L_{mi}(r_d)$ of the surface is obtained directly.

According to another embodiment of step 17, a digital holography method can be used.

In a digital holography method, also called "off-axis interferometry", the measurement and reference beams are adjusted, preferably, so as to be incident on the detector with tilted propagation directions, or forming an angle between them.

When the measurement beam reflected by an interface i and the reference beam have an optical path difference or a retardation smaller than the coherence length of the light source, an interference signal, or interferogram, $I_{mi}(r_d)$, in which the phase information is encoded in a network of fringes in the direction of tilt of the beams, is obtained on the detector.

The interferogram on the detector can be represented using the following equation:

$$I_{mi}(r_d) = |E_{mi}(r_d)|^2 + |E_R|^2 + E_R^* E_{mi}(r_d) + E_{mi}^*(r_d) E_R, \tag{3}$$

with $E_{mi}$ being the electromagnetic wave in complex notation as reflected by the interface i and incident on the detector (measurement beam), $E_R$ being the reference electromagnetic wave in complex notation, assumed to be constant for the sake of simplicity, and * being the complex conjugate.

The first two terms correspond to the zeroth order, the third and fourth terms correspond respectively to the real and virtual images.

By choosing an angle between the measurement and reference beams that is sufficiently large, these different terms or orders of diffraction are separated in the Fourier domain and can thus be filtered.

The term corresponding to the real image can thus be obtained by filtering in the Fourier domain by:

$$E'_R E_{mi}(r_d) = FFT^{-1}(FFT(I_{mi}(r_d))M), \tag{4}$$

where FFT is the fast Fourier transform and $FFT^{-1}$ is its inverse. M is the filter applied in the frequency domain to filter the term corresponding to the real image so as to preserve the spatial frequencies present in the numerical aperture of the focusing objective.

Once the term corresponding to the real image $E_R^* E_{mi}(r_d)$ is obtained, it is possible to digitally illuminate it with a digital reference wave $E_{RD}$ corresponding to the reference wave used, in order to obtain the expression of the electromagnetic field sought $E_{mi}(r_d)$:

$$E_{mi}(r_d) = E_{RD} E_R^* E_{mi}(r_d). \tag{5}$$

It should be noted that by assuming that the reference wave is constant or uniform, this step can also be performed in the Fourier domain by translating the baseband filtered image (around the zero frequency).

Using the phase $\varphi_{mi}(r_d)$ of the electromagnetic field $E_{mi}(r_d)$, it is then possible to determine the optical shape $L_{mi}(r_d)$ of the surface with the relationship (1), as well as the geometric shape $S_{mi}(r_d)$ with the relationship (2).

The optical or geometric shape obtained as described previously is a shape as projected onto the detector. To obtain the real optical or geometric shape of the interface, the effect of the optical system between the interface and the detector must still be taken into account.

When the interface is located in an object plane conjugate to the image plane of the detector and considering a perfect optical system, it is possible to use the enlargement of the imaging system which makes a point $r_i$ in the conjugate object plane correspond to a point $r_d$ of the detector, $r_i$ being a vector of co-ordinates towards points of the conjugate object plane in the reference system (X, Y, Z). Thus the optical $L_{mi}(r_i)$ or geometric $S_{mi}(r_i)$ shape of the corrected interface of the optical system is obtained, with the correct enlargement.

According to an embodiment, it is possible to take into account the aberrations of the optical system. This can be done for example by calibration, by carrying out measurements on a mirror positioned in the place of the optical element 1000. It is thus possible to determine an optical shape resulting from these aberrations, which can be subtracted from the optical shape measured. It is thus also possible to take into account the phase profile of the reference beam on the detector. This makes it possible to improve the precision of the shape measurement performed by the method according to the invention.

According to the acquisition and processing methods, and in particular by implementing a digital holography technique as previously described, it is possible to obtain a complete expression (with the amplitude and the phase) of the electromagnetic field $E_{mi}(r_d)$ at the detector. It is then possible to digitally propagate the electromagnetic field, for example towards another reconstruction plane, with known methods. Some methods use in particular the Fresnel approximation, such as for example the Fourier transform approach (Appl. Opt. 38, 6994-7001 (1999)), angular spectra (Opt. Express 13, 9935-9940 (2005)) or convolutions (Meas. Sci. Technol. 13, R85-R101 (2002)).

For example, in the case where the detector is not exactly in an image plane conjugate to the object plane of an interface, it is possible to determine the electromagnetic field $E_{mi}(r_d)$ in the image plane by digitally propagating the electromagnetic field measured at the detector up to this plane.

Similarly, it is possible to more rigorously determine the shape of the interfaces by propagating the electromagnetic field based on the plane of the detector up to the interface in question.

In order to measure the successive interfaces of an optical element 1000, for example with the devices 4000, 6000, 7000 described in relation to FIGS. 2, 3, 4 and 5, phase $\varphi_{mi}(r_d)$ and/or optical shape $L_{mi}(r_d)$ measurements are acquired successively for the successive interfaces i during steps 12, 13 and 14 of the method 10, by positioning the coherence area and, optionally, the object plane at the level of the interface i measured in each measurement.

However, the interfaces of the optical element 1000 passed through by the measurement beam before an interface i in question 103 also modify the propagation of the measurement beam. They must therefore be taken into account in order to obtain a real item of optical or geometric shape information of the interface i.

According to a non-limitative embodiment and with reference to FIG. 6, the processing phase 16 of the method 10 according to the invention comprises a correction step 18 for taking into account the media passed through by the measurement beam. This correction can be applied to the optical or geometric shapes obtained in step 17.

According to a first example, this correction step 18 is performed using propagation models of the electromagnetic waves through different materials and interfaces up to the interface i in question, including all of the optical components of the interferometer and the interfaces of the optical element to be measured 1000 passed through.

By way of illustration, it is possible to use the simple model described hereinafter. This model is valid in the Fresnel approximation, by assuming a propagation of the electromagnetic waves in homogenous media and through smooth or specular interfaces, without amplitude modulation. It is thus in particular applicable to the measurement of optical elements with refractive elements or lenses.

It is also assumed that each interface 103 measured is positioned in an object plane conjugate to the image plane of the detector using the optical system present between the two. This makes it possible to obtain on the detector an image of the interface with a relationship between this object plane and these image planes which can be modelled using a simple enlargement G, as explained above. This involves displacing the object plane with respect to the optical element to be measured for each measurement of successive interfaces. The relationship, and thus the enlargement, between the image plane and the object plane corresponding to each interface depends on the interfaces of the optical element passed through by the measurement beam up to the interface in question. However, in practice, insofar as the enlargement is essentially determined by the optical system of the interferometer, such as for example the focusing objective 607, 707 and the tube lens 609, 709, owing to their high optical power, it is possible to assume an enlargement G that is known and identical between the image plane and the object planes positioned at the level of the different interfaces.

$E_0(r_d)$ denotes the electromagnetic field of the measurement beam incident on the detector as reflected by a reference element, such as a plane mirror.

The electromagnetic field $E_{m1}(r_d)$ reflected on the first interface of the optical element to be measured and incident on the detector can be written $$E_{m1}(r_d)=E_0(r_d)\exp[-i\varphi_{m1}(r_d)] \quad (6)$$

where $\varphi_{m1}(r_d)$ is the phase due to the reflection on the first interface, as detected by one of the interferometric methods previously described by positioning the coherence area and the object plane conjugate to the image plane of the detector on the first interface.

It is possible to deduce therefrom, as described above, the optical shape of the first interface:

$$L_{m1}(r_d)=\varphi_{m1}(r_d)\lambda/4\pi. \quad (7)$$

The electromagnetic field reflected on the second interface and incident on the detector, ignoring the terms of propagation that are not involved in these calculations, can be written:

$$E_{m2}(r_d)=E_0(r_d)\exp[i\varphi_{m1}(r_d)]\exp[-i\varphi_{m2}(r_d)], \quad (8)$$

where $\varphi_{m2}(r_d)$ is the phase due to the reflection on the second interface, as detected by one of the interferometric methods previously described by positioning the coherence area and the object plane conjugate to the image plane of the detector on the second interface.

The Term $$\varphi'_{m2}(r_d)=\varphi_{m2}(r_d)-\varphi_{m1}(r_d) \quad (9)$$

is the apparent phase, as measured, which includes terms dependent on the interface measured and the preceding interface passed through by the measurement beam in order to reach the interface measured. As long as $\varphi_{m1}(r_d)$, determined previously, is known, it is thus possible to determine $\varphi_{m2}(r_d)$.

Based on $\varphi_{m2}(r_d)$, the corrected, or real, optical shape of the second interface can be determined as follows:

$$L_{m2}(r_d)=\varphi_{m2}(r_d)\lambda/4\pi. \quad (10)$$

Once the optical shapes and positions have been obtained, it is possible to deduce therefrom the geometric shapes by taking into account the refractive indices of the different materials, and the enlargement between the image plane and the object plane.

In the case where a point-mode interferometer as illustrated in FIG. 2 is used, the displacement of the object plane can involve a relative displacement of the collimator 407 which must be taken into account in order to calculate the optical distances or positions of the interfaces at the different measurement points 408 in the field of view.

According to a second example, the correction step 18 is performed by calculating a point spread function (PSF) or an optical transfer function (in the Fourier domain) of the optical system passed through by the measurement beam up to the interface i in question, including all the optical components of the interferometer and the interfaces of the optical element to be measured passed through.

The correction step 18 can also be performed using items of design information on the optical element, where they are available. It is possible for example to use items of design information, such as the shapes or the nominal curvatures of the interfaces, in order to correct the effect of the interfaces passed through by the measurement beam while implementing for example one of the models described previously. It is thus possible for example to validate the shape of an interface in a field of view with a measurement, then to use its complete nominal shape (in particular for aspherical or "freeform" shapes) in order to correct the measurements of the following interfaces. It is also possible, for example, to use a nominal interface shape, but positioned along the optical axis depending on the measurements.

The correction step 18 is performed sequentially, in the order of the interfaces passed through of the optical element. Thus, for each interface in question, corrected optical and/or geometric shapes of the interfaces previously passed through by the measurement beam are available.

The correction step 18 can be performed according to different sequences.

It is in particular possible to acquire or to measure all the phases or all the apparent optical shapes (not corrected) for all the interfaces, then to calculate the corrected optical shapes and geometric shapes in a later sequence.

It is also possible to sequentially acquire and process the interferometric signals of the different interfaces. In this case, it is possible to use the real (corrected) optical or geometric shape of the interfaces determined previously to more rapidly adjust the focusing of the device, and in particular to more effectively position the object plane on the following interface.

As explained previously, the geometric shapes of the interfaces and the thicknesses of the components can be determined based on the optical shapes and thicknesses by knowing the materials of the element to be measured or at least their refractive indices.

According to an example, the positions and the real geometric shapes of the interfaces can be determined sequentially, for each interface measurement. This can make it possible, for example, to use these items of information to calculate the propagation of the light passing through them for measuring the following interfaces.

It is also possible to entirely characterize the optical element to be measured in terms of optical values, without prior knowledge as regards the materials. It is thus possible to determine all the optical shapes and optical positions of corrected interfaces from the propagation effects, then to calculate the geometric shapes and dimensions of the optical element in a later step.

According to the embodiment shown in FIG. 6, the method 10 also comprises a phase 19 of analyzing the items of shape information obtained in the processing phase 16.

According to an example, tilts and/or decentrations can be determined during the analysis phase 19. This determination can be performed, for example, by first determining or estimating the position of the optical axis of the optical element. The optical axis can be defined as the straight line passing as close as possible to the summits or apex (according to the Z-axis of the optical system) of all or part of the surfaces or interfaces measured.

It is then possible to compare the apparent summit of the interface in question with the position of the global or average optical axis of the element to be measured that was previously determined, and/or with positions of the apparent individual optical axes of the optical components identified based on investigations of axes of symmetry.

According to another example, erroneous or off-specification optical components in an optical element can be identified during the analysis phase 19. This identification can be produced, for example, by comparing measurements of the distances, thicknesses or shapes of the surfaces with reference values originating from the design of the optical element. Non-compliant values, such as erroneous thicknesses and/or surface shapes, or components incorrectly positioned along the optical axis, having a non-compliant space between the components, can thus be detected.

According to yet another example, optical components or lenses that are tilted with respect to the optical axis can be identified during the analysis phase 19. This identification can be performed, for example, using steps of

- detecting the summits of all the interfaces, in the measurement direction Z;
- calculating an average optical axis defined by a straight line parallel to the measurement direction Z passing as close as possible (for example in the least-squares direction) to the summits, or obtaining the optical axis by any other means; and
- detecting the interfaces the position of the summit of which moves significantly away from (according to a predetermined criterion) the optical axis. These interfaces correspond to decentered or tilted components.

Optionally, the axis of a component connecting the summits of the interfaces of the component can be determined. This local axis can then be compared with the optical axis of the optical element, in order to determine the decentration (local axis parallel to, but offset from, the optical axis) and/or the tilt (local axis tilted with respect to the optical axis) thereof.

According to other examples, it is also possible to determine, during the analysis phase 19 based on the items of shape information of the interfaces:

- the refractive index of the optical components (if their thickness is known);
- the thickness of the optical components (if their material or their refractive index is known); and/or the topography of the surfaces.

Of course, the invention is not limited to the examples that have just been described, and numerous modifications may be made to these examples without exceeding the scope of the invention.

The invention claimed is:

1. A measurement device, for measuring the shape of an interface to be measured of an optical element comprising a plurality of interfaces, the device comprising:
   measurement means comprising a low-coherence source and at least one interferometric sensor illuminated by the low-coherence source,
   positioning means configured for relative positioning of a coherence area of the interferometric sensor at the level of the interface to be measured;
   the measurement means being configured to direct a measurement beam towards the optical element to pass through said plurality of interfaces, and to selectively detect an interference signal resulting from interferences between the measurement beam reflected by said interface to be measured and a reference beam once the coherence area is positioned; and
   digital processing means configured to produce, based on the interference signal, an item of shape information of said interface to be measured according to a field of view,
   the at least one interferometric sensor comprising a point-mode interferometric sensor and a full-field interferometric sensor.

2. The device according to claim 1, characterized in that the shape information comprises the optical shape and/or the geometric shape of the interface to be measured.

3. The device according to claim 1, characterized in that the positioning means are also configured for relative positioning of an object plane conjugate of an image plane of the interferometric sensor at the level of the interface to be measured.

4. The device according to claim 1, characterized in that the full-field interferometric sensor comprises a Michelson interferometer.

5. The device according to claim 1, characterized in that the full-field interferometric sensor comprises a Mach-Zehnder interferometer.

6. The device according to claim 1, characterized in that the positioning means are configured to position the coherence area successively at the level of different interfaces of the optical element.

7. The device according to claim 1, characterized in that the device also comprises displacement means configured to displace the optical element in a plane perpendicular to the measurement beam.

8. A measurement method for measuring the shape of an interface to be measured of an optical element comprising a plurality of interfaces, the method being implemented by a measurement device comprising measurement means comprising a low-coherence source and at least one interferometric sensor illuminated by the low-coherence source, configured to direct a measurement beam towards the optical element to pass through said plurality of interfaces, and to selectively detect an interference signal resulting from interferences between the measurement beam reflected by said interface to be measured and a reference beam, the at least one interferometric sensor comprising a point-mode interferometric sensor and a full-field interferometric sensor, the device also comprising positioning means and digital processing means, said method comprising the following steps:

relative positioning, by the positioning means, of a coherence area of the interferometric sensor at the level of the interface to be measured;

measuring the interface using the measurement means, so as to produce an interference signal; and     processing the interference signal using the digital processing means, to obtain an item of shape information of said interface to be measured according to a field of view.

9. The method according to claim 8, characterized in that it also comprises a step of relative positioning of an object plane conjugate to an image plane of the interferometric sensor at the level of the interface to be measured.

10. The method according to claim 8, characterized in that at least the step of positioning the coherence area and the measurement step are implemented sequentially for measuring the shape of different interfaces to be measured of the plurality of interfaces.

11. The method according to claim 8, characterized in that the step of processing the interference signal comprises an analysis using profilometry of a plurality of interferograms acquired for a single interface to be measured.

12. The method according to claim 11, characterized in that the plurality of interferograms is acquired according to a phase-shifting interferometric method or according to a vertical scanning interferometric method.

13. The method according to claim 8, characterized in that the step of processing the interference signal also comprises a correction step taking into account an item of shape information of the interfaces passed through by the measurement beam, to obtain an item of optical shape and/or geometric shape information of the interface to be measured.

14. The method according to claim 8, characterized in that the method is implemented to measure the shapes and/or the positions of the interfaces of an optical element in the form of an optical assembly with lenses, the interfaces comprising the surfaces of the lenses.

* * * * *